E. H. MERRYMAN.
Butter Worker.

No. 6,898.

Patented Nov. 27, 1849.

UNITED STATES PATENT OFFICE.

ELIAS H. MERRYMAN, OF SPRINGFIELD, ILLINOIS.

BUTTER-WORKING MACHINE.

Specification of Letters Patent No. 6,898, dated November 27, 1849.

*To all whom it may concern:*

Be it known that I, ELIAS H. MERRYMAN, in the city of Springfield and State of Illinois, have invented a new and useful machine entitled the Eagle Butter-Machine for the preservation of fresh butter and removing rancidity from old butter; and I do hereby declare that the following is a full, clear, and exact description of the construction and operation of the same, reference being had to the annexed drawings, making a part of this specification.

Similar letters indicate like parts in all the figures.

Figure 1:
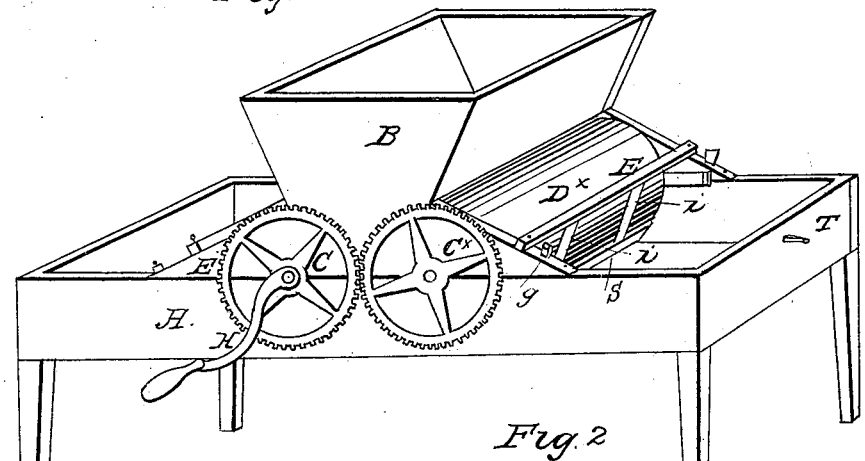
Figure 2:
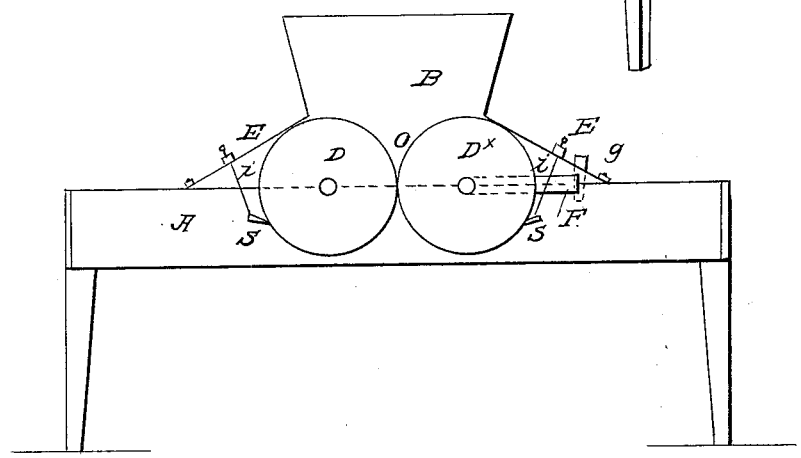
Figure 3:
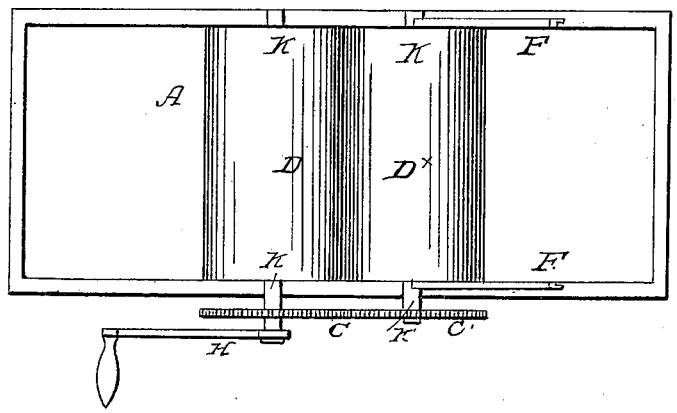

Figure 1 represents a perspective elevation. Fig. 2, a longitudinal section through the rollers. Fig. 3, a view of the plane of the box or vat, without the hopper, showing the rollers and followers in place.

The machine consists of the vat A, in which are placed two smooth rollers, D, D+, of wood or metal, wood is preferable, running by the operation of two spur wheels C, C+, turned by a crank H, or any other method of power. The rollers are just the length of the width of the vat, and run in boxes in the sides of it, and are confined to their places and prevented from rising by the hopper, B, which is let down on the sides of the vat, the boxes of the hopper act as caps to the journals, K, of the rollers. The roller D+, is kept in contact with the roller D, by the followers F, F, operated upon by the keys, *g*, *g*. There are grooves in the sides of the vat, and similar ones in the sides of the hopper B to correspond, forming a seat in which the followers slide. The spur wheels C, C+, operate on the outside of the vat. On the lower or cap portion of the hopper, B, and reaching across the vat toward either end, are the spring bars E, E, fastened by pins in each end. To these bars are attached the springs, of wood or metal, *i*, *i*, to which are affixed at the lower extremities the scrapers S, S. At any convenient point may be placed a spout T, on a line with the boxes in which the journals of the rollers run.

When the machine is to be operated the vat A, is filled with water as high as the boxes for the journals, when it can be done it is better to have a constant stream of water pouring into the vat and escaping at the spout T. The butter is placed in the hopper B, and the crank H, is turned over toward the roller D+, when the rollers acquire a motion toward each other and the butter is forced between them and passes below into the water, or adheres to the lower portions of the rollers, from which it is scraped by the scrapers S, S. During the operation a portion of the water is carried over by the roller and lodges in the space indicated by O, in Fig. 2, formed by the rollers and between the sides of the hopper. Here commingling with the butter, as the latter is crushed by the rollers, the water is agitated and mixes with the buttermilk, carrying upward the casein or cheesy matter of the milk and the fragments of capsules of the butter. If the butter be then taken from the vat and placed in air-tight vessels, it may be kept pure for years.

What I claim as my invention and desire to secure by Letters Patent, is—

The use of two or more rollers, with adjustable scrapers, held in contact with the rollers by springs, or other devices, operating in a vat of running water, to wash butter, and separate the broken capsules, cheesy matter, buttermilk and other impurities, by dissolving those that are soluble in water, and washing away those that are not soluble, substantially as described, the water being let into the vat from a cistern placed above the level of the vat, and escaping at the spout T, on a level with the journals of the rollers.

ELIAS H. MERRYMAN

Witnesses:
C. W. MATHERY,
H. H. SNOW